(12) United States Patent
Gaikwad et al.

(10) Patent No.: US 8,751,757 B1
(45) Date of Patent: Jun. 10, 2014

(54) ACQUISITION AND KERNEL MEMORY STORAGE OF I/O METRICS

(75) Inventors: Deepak M. Gaikwad, Mississauga (CA); Robert J. Pellowski, Ledyard, CT (US); Edith Epstein, Arlington, MA (US); Hitesh Trivedi, Cambridge, MA (US); Helen S. Raizen, Jamaica Plain, MA (US)

(73) Assignee: EMC Corporation, Hopkinton, MA (US)

(*) Notice: Subject to any disclaimer, the term of this patent is extended or adjusted under 35 U.S.C. 154(b) by 173 days.

(21) Appl. No.: 13/341,348

(22) Filed: Dec. 30, 2011

(51) Int. Cl.
 *G06F 12/00* (2006.01)
(52) U.S. Cl.
 USPC .......................... 711/156; 711/154; 711/171
(58) Field of Classification Search
 CPC . G06F 11/3485; G06F 11/3447; G06F 3/061; G06F 3/0635; G06F 2009/45579
 USPC ............... 711/154, 156, 171; 710/29
 See application file for complete search history.

(56) References Cited

U.S. PATENT DOCUMENTS

| | | | | |
|---|---|---|---|---|
| 7,277,821 | B2 * | 10/2007 | Ochi et al. ................ | 702/182 |
| 7,454,478 | B1 * | 11/2008 | Rosselli et al. ............ | 709/214 |
| 7,830,814 | B1 * | 11/2010 | Allen et al. ............... | 370/252 |
| 7,936,790 | B2 * | 5/2011 | Schmidt et al. ............ | 370/503 |
| 8,140,725 | B2 | 3/2012 | Butler et al. | |
| 8,266,280 | B2 | 9/2012 | Murthy et al. | |
| 2003/0033403 | A1 * | 2/2003 | Rhodes ..................... | 709/224 |
| 2003/0103486 | A1 * | 6/2003 | Salt et al. ................. | 370/350 |
| 2007/0208849 | A1 * | 9/2007 | Ely et al. .................. | 709/224 |
| 2008/0126698 | A1 * | 5/2008 | Honda ...................... | 711/114 |
| 2008/0222321 | A1 * | 9/2008 | Hart et al. ................. | 710/39 |
| 2008/0263261 | A1 * | 10/2008 | Fujimoto et al. .......... | 711/100 |
| 2008/0301333 | A1 * | 12/2008 | Butler et al. .............. | 710/38 |
| 2009/0285098 | A1 * | 11/2009 | Qi ........................... | 370/235 |
| 2010/0191876 | A1 * | 7/2010 | Muppirala et al. ........ | 710/39 |
| 2011/0239220 | A1 * | 9/2011 | Gibson et al. ............. | 718/103 |
| 2012/0078894 | A1 * | 3/2012 | Jiang et al. ............... | 707/723 |
| 2012/0221745 | A1 | 8/2012 | Murth et al. | |

OTHER PUBLICATIONS

"EMC Powerpath Load Balancing and Failover Comparison with Native MPIO Operating System Solutions," White Paper, EMC Corporation, 2011, 28 pages.
"SNIA Advancing Storage & Information Technology, Multipath Management API," Version 1.1, SNIA Technical Position, Mar. 8, 2010, 121 pages.

\* cited by examiner

*Primary Examiner* — Sanjiv Shah
*Assistant Examiner* — Edward Waddy, Jr.
(74) *Attorney, Agent, or Firm* — BainwoodHuang

(57) ABSTRACT

An improved technique for storing I/O metrics includes assigning metric values to data buckets held in kernel memory. Each data bucket covers a particular range of values of a respective metric and is configured as a counter, whose count is incremented each time the multipathing driver obtains or computes a metric value that falls within the range of the data bucket. Bucket counts can be read by an external program to obtain aggregate information about I/O metrics over time. The aggregate information can be fed back to the multipathing driver to enable improved selections of paths for conveying data to and from a storage array.

20 Claims, 6 Drawing Sheets

ACQUISITION AND KERNEL MEMORY STORAGE OF I/O METRICS

BACKGROUND

Host computing systems (i.e., "hosts") commonly employ storage arrays for retaining large amounts of data. A host, such as a data server or web server, generally connects to a storage array through multiple paths. Multiple paths allow for redundant connections, parallel data transmission, load balancing, and failover.

Conventionally, the host employs a multipathing driver to manage the paths connecting the host to the storage array. An example of a multipathing driver is the PowerPath® driver from EMC Corporation of Hopkinton, Mass.

Multipathing drivers typically operate in response to incoming I/O requests. As is known, an "I/O request" is a command, generally arising from the host's operating system in response to an executing program or other software construct, to transmit data to the storage array or to obtain data from the storage array. As the multipathing driver responds to I/O requests, it typically collects metrics related to I/O performance.

SUMMARY

Multipathing drivers are generally allocated only a small amount of kernel memory in which to function. To conserve memory, metric values are conventionally stored with low precision. Low precision metric values are often too coarse to afford much value, however. As an alternative to storing metrics with low precision within the driver, high precision metric values are sometimes collected and moved off of the multipathing driver, such as to a file accessible through a file system of the host. This way, high precision metric values can be preserved indefinitely, without consuming kernel memory. However, transmitting I/O metrics to a file adds overhead that can impair performance of the multipathing driver.

In contrast with this conventional approach, an improved technique for storing I/O metrics includes assigning metric values to data buckets held in kernel memory. Each data bucket, or bin, covers a particular range of values of a respective metric and may be configured as a counter, whose count is incremented each time the multipathing driver obtains or computes a metric value that falls within the range of the data bucket. Therefore, rather than holding metric values as distinct numbers, which can consume a great deal of scarce kernel memory, metric values are held instead as bucket counts, wherein each count represents a respective metric value obtained or computed by the multipathing driver. Once a metric value is counted, the count is retained but the underlying metric value is discarded, thereby liberating kernel memory for other uses.

For certain metrics, the size of the data buckets holding counts of metric values is preferably non-uniform, e.g., buckets representing smaller values of a metric cover smaller ranges than buckets representing larger values. In one example, buckets are arranged in exponentially increasing sizes. The resolution applied to smaller metric values is thus much greater, in absolute terms, than the resolution applied to larger metric values. For many metrics, storing metric values in this way preserves information about the magnitude of the metrics, which would otherwise be lost or distorted if uniformly sized buckets were used.

In certain examples, the bucket counts of a multipathing driver are accessed by an external program, such as a data analysis tool running on the host or elsewhere. The data analysis tool can perform aggregate data analysis on bucket counts and provide summary information pertaining to performance of the multipathing driver, paths, and storage array. This information can be used for diagnostic and/or prognostic purposes. Also, summary information can be fed back to the multipathing driver for use in optimizing its selection of paths for responding to subsequent I/O requests.

One embodiment of the improvement hereof is directed to a method operable on a computing device for obtaining performance information relating to data storage. The method includes providing, in a software driver running within a kernel of the computing device, multiple data buckets for storing information pertaining to a metric that relates to data storage. Each data bucket covers a different range of values of the metric. The method further includes monitoring I/O operations attempted between the computing device and at least one logical storage unit (LUN) to produce multiple values of the metric. The method still further includes assigning each value of the metric to one of the data buckets for the metric, counting the number of values of the metric assigned to each data bucket to produce multiple data bucket totals, and discarding the counted values of the metric.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

An improved technique for storing I/O metrics includes assigning metric values to data buckets held in kernel memory. Each data bucket covers a particular range of values of a respective metric and is configured as a counter, whose count is incremented each time the multipathing driver obtains or computes a metric value that falls within the range of the data bucket. Bucket counts are read by an external program to obtain aggregate information about I/O metrics over time. The aggregate information is fed back to the multipathing driver to enable improved selections of paths for conveying data to and from a storage array.

Figure 1:
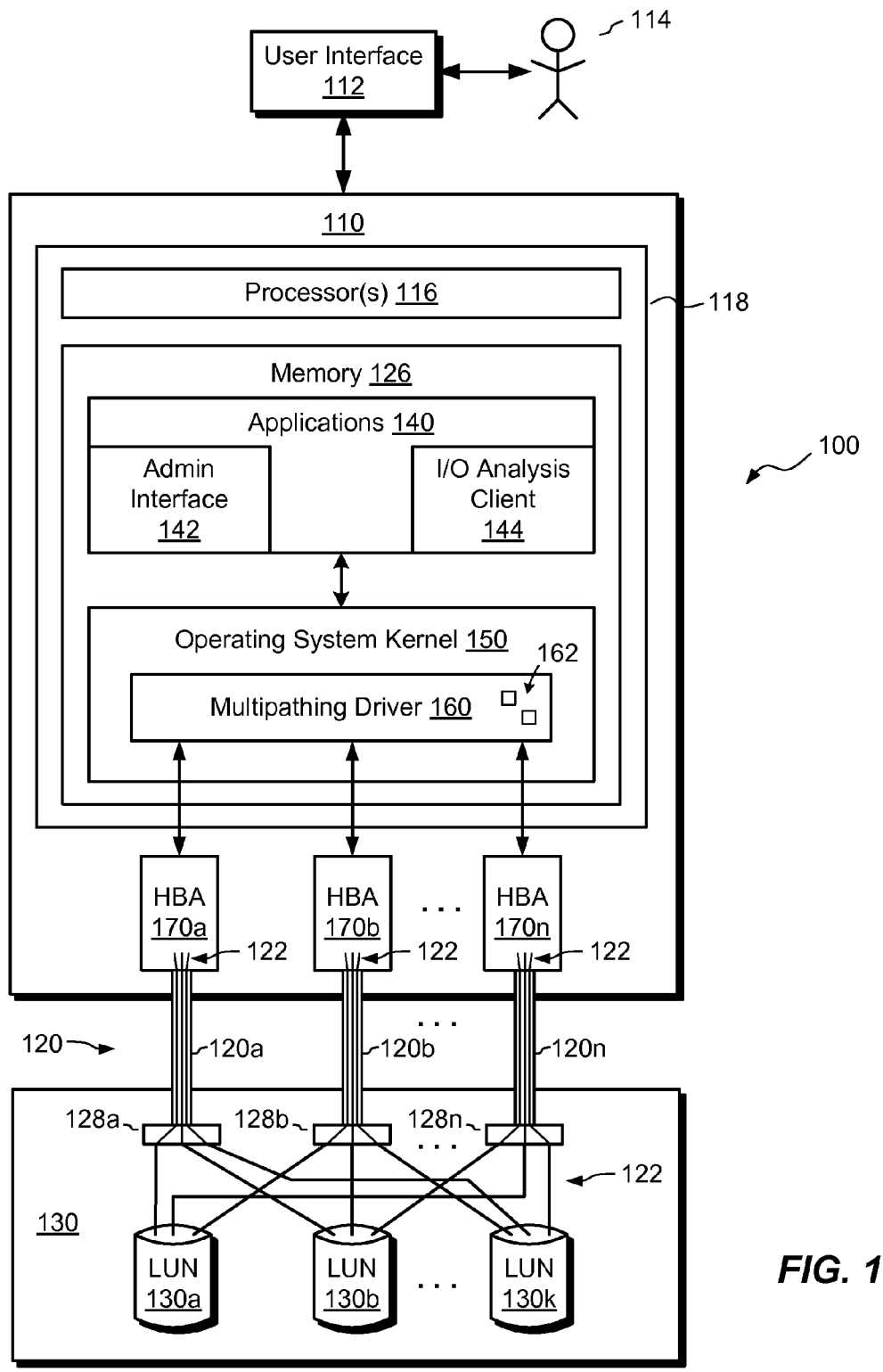
FIG. 1 is a block diagram of an example environment including a multipathing driver in which data storage metrics are assigned to data buckets.

FIG. 1 shows an example computing environment 100 wherein a multipathing driver 160 includes data buckets 162 for holding metric values. The environment 100 includes a computing device, referred to herein as a "host" 110. The host 110 presents a user interface 112 for receiving input from and providing output to a user 114. The host 110 also connects to a storage array 130 via busses 120 (e.g., SCSI Initiator-Targets, or I-Ts), where each bus 120a-n includes multiple paths 122 (e.g., Initiator-Target-LUNs, or I-T-Ls). SCSI is an acronym for Small Computing System Interface.

The host 110 includes a set of processors 116 (i.e., one or more processing chips and/or processing boards), memory 126, and multiple host bus adapters 170a-n. The memory 126 includes both volatile and non-volatile memory. The host bus adapters 170a-n perform the role of SCSI initiators, each forming one end of a respective bus 120a-n. Management of multiple paths 122 by the multipathing driver 160 affords redundancy, parallelism, failover, and high throughput.

The memory 126 includes application programs 140. The application programs 140 include an administrative interface 142, which permits an administrator to manage and configure the multipathing driver 160. The application programs 140 also include an I/O analysis client 144, which accesses the buckets 162 held by the multipathing driver 160 to perform data analysis of bucket totals. The memory 126 also includes an operating system kernel 150. The multipathing driver 160 is installed within the kernel 150 as a kernel extension, e.g., a portion of executable code that runs in kernel space. It is understood that the set of processors 116 and the memory 126 function cooperatively and can be regarded as forming a specialized circuit 118, which performs the various processes and functions described herein.

The storage array 130 is preferably a disk array or some other array of non-volatile storage elements. In the example shown, the storage array 130 includes SCSI targets 128a-n. Paths 122 each originate from a particular one of the host bus adapters 170a-n, extend through a respective bus 120a-n, traverse a respective SCSI target 128a-n, and extend to a respective logical storage unit, or "LUN" 130a-k. Each path 122 is specific to a LUN 130a-k. Any number of LUNs 130a-k may be provided. Each LUN 130a-k is a separately identifiable storage volume, which is logically but not necessarily physically distinct from other LUNs 130a-k. Various computing nodes may also be included within the storage array 130. These are omitted from the figure for the sake of clarity.

The host 110 is typically a server with high data throughput to the storage array 130. However, the host 110 can be any type of computing device, such as a server, desktop computer, laptop computer, or even a computing pad, smart phone, PDA, or similar device. The operating system 150 can be any type of operating system that supports the installation of the multipathing driver 160 as a kernel extension. These may include conventional, GUI-based operating systems, embedded operating systems, real-time operating systems, and so on. Non-limiting examples include the Windows™ operating system, Unix, Red Hat Linux, or vSphere® from VMware®, for instance. In some examples, the operating system 150 may be provided in the form of a hypervisor and/or virtual memory manager, for supporting the instantiation of one or more virtual machines.

In typical operation, the user 114 runs an application program 140, which causes the host 110 to process I/O requests. I/O requests specify data to be read from and written to particular LUNs 130a-k on the storage array 130. In the case of writes, the multipathing driver 160 performs various processes in connection with the data to be sent, such as selecting a path and/or encryption for the data. The multipathing driver 160 sends the data over the selected path 122 to a specified LUN 130a-k and generally receives an acknowledgement from the storage array 130 to indicate whether data has been successfully received. If the selected path 122 is down, the operation may timeout and the write may be attempted along another path 122. In the case of reads, the multipathing driver 160 processes the request (e.g., by selecting a path 122, decryption for the returning data, and/or the location of a buffer where returned data is to be stored) and sends the processed request to the corresponding LUN 130a-k that stores the requested data. The LUN 130a-k receives the processed request, and the requested data is sent back to the host 110 along the same path 122 that conveyed the request. The multipathing driver 160 processes the data, such as by specifying decryption for the data received. If the selected path is down, the operation may timeout and be retried on another path. In responding to I/O requests for both reads and writes, various I/O metrics are collected and stored in the data buckets 162 of the multipathing driver 160.

Figure 2:
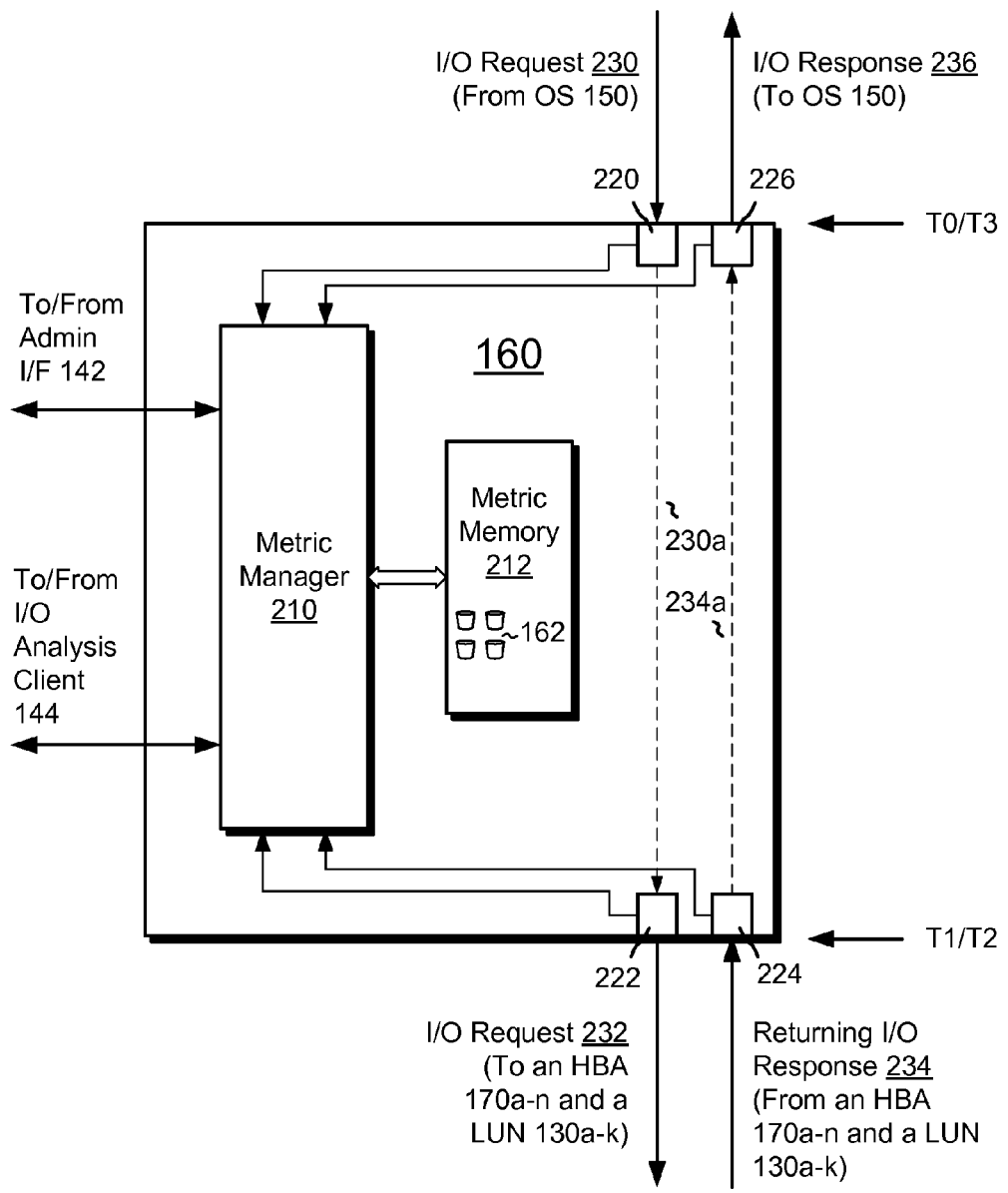
FIG. 2 is a block diagram of an example multipathing driver as shown in FIG. 1.

FIG. 2 shows additional details of the multipathing driver 160. Here, it is seen that the multipathing driver 160 includes a metric manager 210 and metric memory 212. The metric memory 212 includes the data buckets 162. The multipathing driver 160 also includes I/O monitors 220, 222, 224, and 226, as well as processing pathways 230a and 234a. The I/O monitors 220, 222, 224, and 226 are software constructs within the multipathing driver 160 for monitoring I/O requests and I/O responses and for recording timestamps. The processing pathways 230a and 234a respectively indicate pathways through the multipathing driver 160 of I/O requests 230 en route to the host bus adapters 170a-n, and of I/O responses 234 returning from the host bus adapters 170a-n.

During operation, an I/O request 230 arrives at the multipathing driver 160 from the operating system 150 (or rather, from another portion thereof). The I/O monitor 220 detects the arrival of the I/O request 230 and obtains a timestamp T0 indicating the time and date of arrival of the I/O request 230. The I/O monitor 220 also examines the I/O request 230 to determine how much data the I/O request 230 prescribes to be written or read (i.e., the I/O size). The I/O size and timestamp T0 are sent to the metric manager 210, which holds them in memory. The I/O request 230 is then processed by the multipathing driver 160 along the pathway 230a. For example, data encryption and a path for transmission to or from the storage array 130 may be specified, as well as a buffer location for any data returned in response to the I/O request. When the I/O request 230 reaches the end of the processing pathway 230a, the I/O monitor 222 obtains a timestamp T1. The timestamp T1 is sent to the metric manager 210. A processed I/O request 232 passes from the multipathing driver 160, e.g., to other components of the host's I/O stack, such as the host bus adapters 170a-n, and eventually to the storage array 130. As is understood by those familiar with I/O drivers, there can be other layers of I/O processing, for instance between the multipathing driver 160 and the host bus adapters 170a-n, which are not described here for purposes of simplicity.

Once the I/O request 232 has been sent to the storage array 130 and received by a respective LUN 130a-k, the LUN generally sends back a response. The response is conveyed via a path 122, received via the host bus adapters 170a-n, and conveyed to the multipathing driver 160 in the form of a returning I/O response 234. The returning I/O response 234 includes an acknowledgement indicating whether data was successfully read from or written to the storage array 130. The I/O monitor 224 detects the returning I/O response 234 and records a timestamp T2 that indicates the time and date when the returning I/O response 234 reaches the multipathing driver 160. The timestamp T2 is sent to the metric manager 210. The returning I/O response 234 then propagates through the driver 160 along the processing pathway 234a. For example, decryption may be specified and applied to any data returned. The returning I/O response 234 encounters the I/O monitor 226 as it passes from the multipathing driver 160 and returns to the operating system 150 (or, rather, to another portion thereof) in the form of I/O response 236. The I/O monitor 226 detects the end of processing along the processing pathway 234a and applies a timestamp T3. The timestamp T3 is sent to the metric manager 210.

As also shown in FIG. 2, the multipathing driver 160 communicates with the administrative interface 142, for receiving management and configuration information. Also as shown in FIG. 2, the multipathing driver 160 communicates with the I/O analysis client 144, for enabling data analysis of bucket totals.

Figure 3:
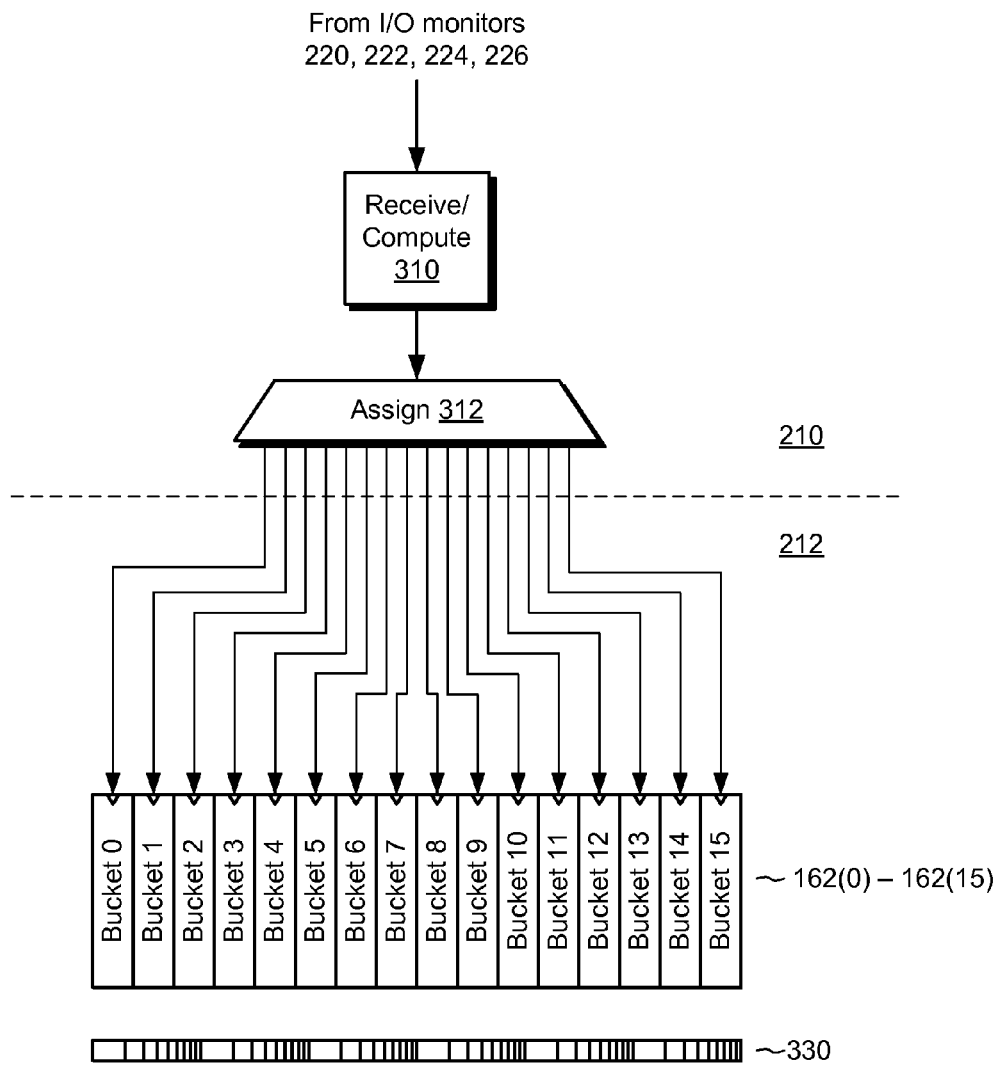
FIG. 3 is a block diagram showing portions of the multipathing driver of FIGS. 1 and 2.

FIG. 3 shows additional details of the multipathing driver 160. A receive/compute block 310 receives metric values and timestamps from the I/O monitors 220, 222, 224, and 226 and computes additional metric values based on the timestamps. For example, the receive/compute block 310 can compute driver latency of I/O requests as T1−T0 and can compute driver latency of I/O responses as T3−T2. Round trip path latency can be computed as T2−T1, and total round trip latency can be computed as T3−T0. In some examples, the receive/compute block 310 can obtain and/or compute a wide range of other metric values pertaining to the multipathing driver 160, the paths 122, and/or the storage array 130.

Once metric values have been obtained or computed, metric values are assigned to buckets. In one example, 16 buckets 162(0)-162(15) are provided for each metric. Each bucket 162(0)-162(15) is preferably implemented as a software counter having, for example, 64 bits. The buckets cover contiguous, non-overlapping ranges extending from the smallest expected values of the metric to the largest. In some examples, the range of bucket 0 (i.e., 162(0)) is designated as covering all values less than some upper limit (e.g., <100). Similarly, in some examples, the range of bucket 15 (i.e., 162(15)) is designated as covering all values greater than some lower limit (e.g., >5,000,000). Designations of ranges for intermediate buckets can be made in any suitable manner. Preferably, for at least some metrics, the ranges for the different buckets 162(0)-162(15) are not uniform but are rather arranged logarithmically, where higher indexed buckets cover much larger ranges than smaller indexed buckets. Legend 330 shows in concept the logarithmic designation of the ranges associated with buckets 162(0)-162(15).

An assign block 312 performs assignments of metric values to buckets 162(0)-162(15). In one example, the assign block 312 subjects each metric value from the receive/compute block 310 to a series of comparisons to identify an appropriate bucket for the metric value. An example set of comparisons is shown below, where "MV" is the metric value:

If MV<100, increment bucket 0;
If MV>=100 AND MV<200, increment bucket 1;
If MV>=200 AND MV<500, increment bucket 2;
If MV>=500 AND MV<1,000, increment bucket 3;
If MV>=1,000 AND MV<2,000, increment bucket 4;
If MV>=2,000 AND MV<5,000, increment bucket 5;
If MV>=5,000 AND MV<10,000, increment bucket 6;
If MV>=10,000 AND MV<20,000, increment bucket 7;
If MV>=20,000 AND MV<50,000, increment bucket 8;
If MV>=50,000 AND MV<100,000, increment bucket 9;
If MV>=100,000 AND MV<200,000, increment bucket 10;
If MV>=200,000 AND MV<500,000, increment bucket 11;
If MV>=500,000 AND MV<1,000,000, increment bucket 12;
If MV>=1,000,000 AND MV<2,000,000, increment bucket 13;
If MV>=2,000,000 AND MV<5,000,000, increment bucket 14;
If MV>=5,000,000, increment bucket 15;

Other techniques for assigning metric values to buckets can be performed, such as binary search techniques and other methods. Also, although each metric is described as being implemented using 16 counters each having 64 bits, this is merely an example. Greater or fewer numbers of counters can be provided for each metric, and different numbers of counters can be provided for different metrics. Also, the counters can have greater or fewer than 64 bits. It has been observed, however, that 64-bit counters are a good fit for many implementations because, without consuming much memory, they allow a significant amount of time to pass before the counters overflow, during which time counter totals will most likely have been read (e.g., by the I/O analysis client 144) and summarized or recorded elsewhere.

Operations of the multipathing driver 160 can be controlled with the administrative interface 142. These operations include, for example, turning on and off monitoring of I/O operations to produce metrics. The operations also include, for example, designating the number of ranges to be used for each metric and designating the size of each range.

Figure 4:
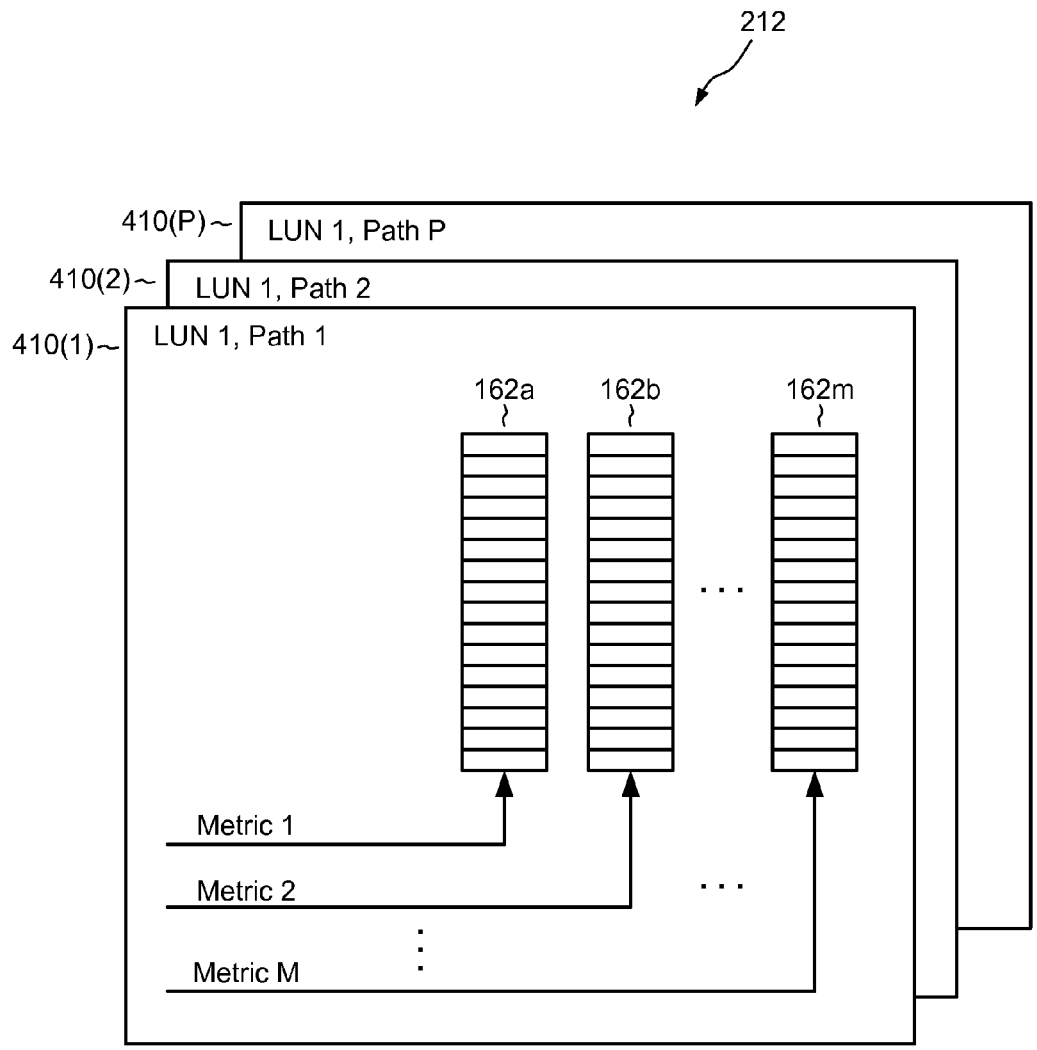
FIG. 4 is a block diagram showing an arrangement of a metric memory of FIG. 2.

FIG. 4 shows additional aspects of bucket storage. Here, it is seen that metric values are produced for multiple metrics, i.e., Metric 1-Metric M. Each metric provides metric values to a respective set of buckets, i.e., one of 162a-m. In some examples, there may be as many sets of buckets 162a-m as there are different metrics monitored by the multipathing driver 160. Examples of different metrics include I/O size and the different I/O latencies described in connection with FIG. 3.

In addition, the metric memory 212 preferably organizes different sets of buckets 162a-m on a per LUN basis, i.e., for each LUN 130a-k, and on a per path basis, i.e., for each path 122 (410(1)-410(P)). Metric value sets may be further organized by I/O request type (i.e., read versus write). Preferably, data bucket totals are stored in a multidimensional data structure within the metric memory 212, which is accessed via the metric manager 210.

Figure 5:
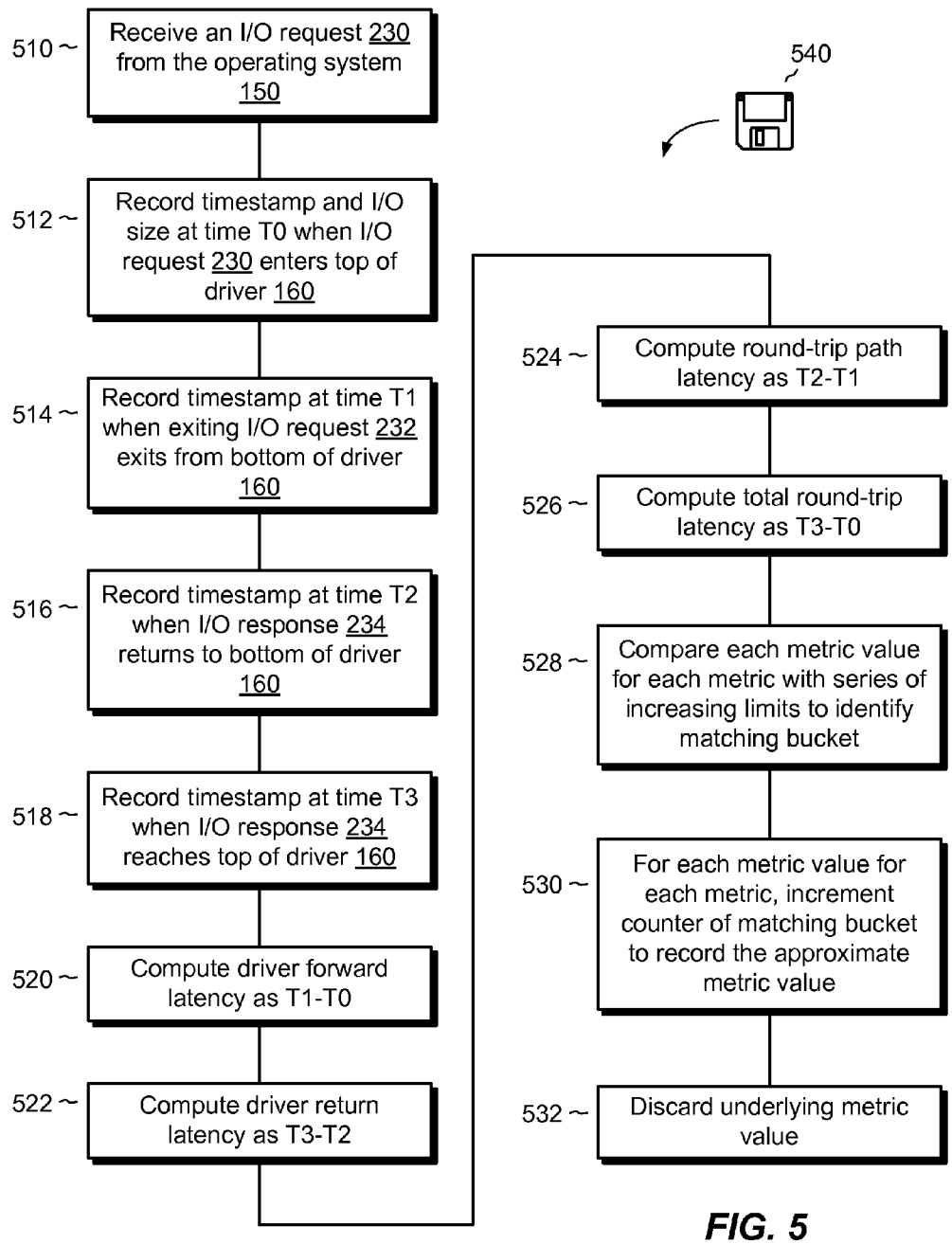
FIG. 5 is a flowchart showing a process for obtaining, computing, and storing I/O metrics in data buckets.
Figure 6:
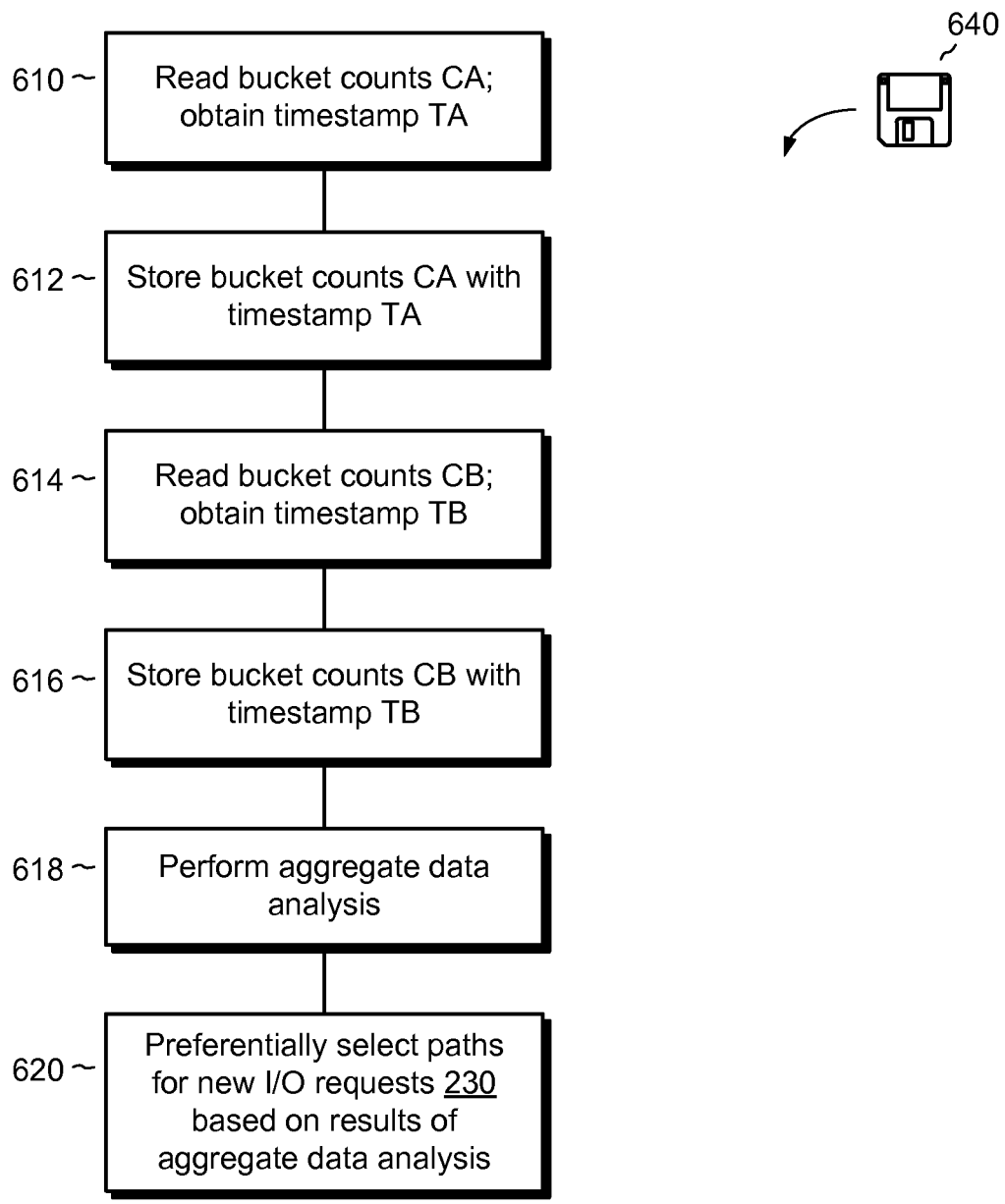
FIG. 6 is a flowchart showing a process for acquiring and performing aggregate data analysis based on bucket counts.

FIGS. 5-6 show processes that may be carried out in connection with the computing environment 100. These processes are typically performed by the set of processors 116 acting in cooperation with the memory 126.

FIG. 5 shows an example process for receiving and computing I/O metrics and assigning I/O metrics to data buckets. At step 510, the multipathing driver 160 receives an I/O request 230. A timestamp T0 is recorded at step 512 (e.g., by the I/O monitor 220) as the I/O request 230 enters the multipathing driver 160. An I/O size, which is included as part of the I/O request 230, is also recorded at this time. The I/O request 230 propagates through the multipathing driver 160 (e.g., along the processing pathway 230a), until it emerges from the multipathing driver 160 in the form of I/O request 232, at which point a timestamp T1 is recorded (step 514, e.g., by the I/O monitor 222). The I/O request 232 may then undergo further processing along the host's I/O stack, such as by the host bus adapters 170a-n, before being conveyed to the storage array 130.

At step 516, an I/O response 234 (in response to the respective I/O request 232) arrives at the multipathing driver 160 and a timestamp T2 is recorded (e.g., by the I/O monitor 224). The I/O response 234 then propagates back through the multipathing driver 160 (e.g., along the processing pathway 234*a*), until it passes from the multipathing driver 160, whereupon a timestamp T3 is recorded (step 518, e.g., by the I/O monitor 226).

Metric values are then calculated using the acquired timestamps. At step 520, forward latency of I/O requests through the multipathing driver 160 along the processing pathway 230*a* is computed as T1−T0. At step 522, return latency of I/O responses through the multipathing driver 160 along the processing pathway 234*a* is computed as T3−T2. At step 524, round trip path latency, e.g., to the storage array 130 and back, is computed as T2−T1. At step 526, total round trip latency, including both driver and external latency, is computed as T3−T0.

At step 528, each metric value for each metric is compared with a series of increasing limit values to identify a matching bucket, such as in the manner described in connection with FIG. 3. At step 530, the software counter associated with each matching bucket is incremented, effectively storing the metric value as a bucket count. The raw value of the metric, which may be represented in the multipathing driver 160 with arbitrarily high precision, is then typically discarded, i.e., the space it occupies in kernel memory location is liberated for other purposes (step 532).

It is understood that not all attempted I/O operations may succeed. For example, some I/O operations may fail to complete because paths 122 or other hardware may not operate as intended. For these I/O operations, metric values may be collected for multiple paths in response to a single I/O request, in addition to metric values for the I/O request itself, which is generally associated with a LUN.

Although FIG. 5 shows a process for recording metric values in response to one I/O request, it is understood that the process can be repeated for multiple I/O requests to obtain large numbers of metric values. Also, the process of FIG. 5 can be repeated for different paths 122, for different LUNs 130*a-k*, and for I/O requests designating both reads and writes, to populate the data structure of bucket totals in the metric memory 212. It is further understood that metric values in addition to those described, or fewer than those described, may be processed. The method shown should therefore be regarded merely as an example.

FIG. 6 shows a process for reading back bucket totals and performing aggregate data analysis and statistics. This process is preferably carried out by the I/O analysis client 144 running on the host 110. The I/O analysis client 144 runs outside the kernel 160 and is thus not nearly as constrained with regard to memory and software capability as the multipathing driver 160. Alternatively, the process of FIG. 6 may be performed by another application 140 or by a program off of the host 110, such as an application running on a computer connected to the host 110 over a computer network.

At step 610, bucket counts, referred to as CA, are obtained from the metric memory 212. A timestamp TA is also obtained, to identify the time when bucket counts CA are retrieved. Preferably, bucket counts CA include all bucket counts for all metrics across all paths 122, all LUNs 130*a-k*, and for both reads and writes. Alternatively, bucket counts CA may be restricted to individual metrics or selected groups of metrics. The bucket counts CA and timestamp TA are stored at step 612.

At step 614, bucket counts CB are obtained from the metric memory 212 and a timestamp TB is obtained. Step 614 is similar to step 610, except that it occurs later in time and involves different bucket counts and a different timestamp. Bucket counts CB and timestamp TB are stored at step 616.

At step 618, aggregate data analysis is performed. The analysis may include, for example, calculating the total number of I/O requests processed (e.g., as the sum of all 16 bucket counts for I/O size). For any given metric, the distribution of metric values can be observed based on the counts in each bucket. Statistics for metric values can also be estimated by assigning a metric value to represent each bucket (e.g., a value midway between the bucket's limits) and applying bucket counts to calculate statistical values.

Aggregate I/O size processed by the host 110 for the time period TB−TA is computed as the difference in counts across all I/O size metrics between times TA and TB, multiplied by respective weighting factors and summed together, where each weighting factor corresponds to a representative size of metric values covered by the respective bucket. Aggregate I/O size can be represented symbolically as $$AggregateSize = \sum_{i=0}^{15} W_i(CB_i - CA_i).$$

where "i" is a range index and $W_i$ is the weighting factor for each range. In one example, the weighting factor may be selected as the midpoint of each range. For instance, if a range extends from 200 to 500, the weighting factor for that range could be set to 350. Alternatively, the weighting factor could be set to the log of the midpoint, or any other suitably representative value. Aggregate I/O rate (i.e., throughput) can also be estimated, for example, by dividing the above-computed aggregate I/O size by the time difference TB−TA.

At step 620, information obtained from the aggregate data analysis is fed back to the multipathing driver 160 for use in selecting optimal paths for data transmission in response to I/O requests. For example, aggregate data analysis may reveal that certain paths 122 consistently operate at higher speeds than other paths. These faster paths are then selected preferentially by the multipathing driver 160 in assigning paths for data transmission in responding to subsequent I/O requests.

The various acts shown in FIGS. 5 and 6 may be ordered in any suitable way. Accordingly, embodiments may be constructed in which acts are performed in orders different from those illustrated, which may include performing some acts simultaneously, even though the acts are shown as sequential in the illustrated embodiments.

The technique described herein represents metric values as data bucket counts and substantially reduces the amount of kernel memory required to store metric values. Through the use of contiguous bucket ranges, sufficient precision is maintained for both large and small metric values. The need to store metric values in an external file is therefore avoided, as is the burdensome overhead that external file access entails. Bucket totals can be read periodically, or occasionally, as desired, by an application program, which performs aggregate data analysis and provides feedback to the multipathing driver 160 for improving its process of path selection.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, although it has been described that buckets store counts of metric values, buckets may also store sums of metric values. For instance, each bucket for I/O size can be configured to store (1) a count of I/O requests having I/O sizes that fall within the range of the bucket (as described above), (2) a sum of all I/O sizes counted in (1), and (3) a sum of all round-trip latencies associated with I/O requests counted in (1). Additional values can be stored for each bucket, such as sums for each of the latency measurements besides round-trip latency obtained in FIG. 5.

Similar sums may be computed and stored for latency buckets. For instance, each bucket for round-trip latency can be configured to store (1) a count of I/O requests having round-trip latencies that fall within the range of the bucket (as described above), (2) a sum of all round-trip latencies counted in (1), and (3) a sum of all I/O sizes for each I/O request counted in (1). Similar sums can be computed and stored in the same manner for each of the other latencies shown in FIG. 5.

In some examples, bucket counts and sums can be stored together in an array, where the array has an index that spans the number of ranges specified for the metric values to be counted (e.g., 16). The array can store, for each index (range) the count of metric values for the respective range as well as any sums computed.

In some examples, sums of metric values can be computed and stored as indicated above, even when counts of metric values are not obtained or stored.

Storing sums of metric values in addition to bucket counts provides a rich set of accurate data from which to calculate aggregate I/O size, latency as a function of I/O size, average response times (sum of round-trip latency divided by I/O count) and throughput (sum of bytes transferred divided by the elapsed time between successive reads of the stored sums). Sums can be read by the I/O analysis client 144, which can apply timestamps each time the sums are read, to allow for aggregate computations. The sums are calculated from raw metric values and thus preserve accuracy. Although storing sums does consume some additional kernel memory, it significantly improves the accuracy of metric reporting and may be preferred in some implementations.

Also, the implementations shown and described relate to I/O metric storage by a multipathing driver. However, this is merely an example. Alternatively, the structures and methods described herein can be applied to metrics other than I/O metrics and to drivers other than multipathing drivers. Also, the structures and methods described herein can be applied to software constructs other than drivers.

Also, although the multipathing driver 160 is shown as part of an operating system 150, it is understood that the host 110 can include multiple operating systems 150 all under the control of a common hypervisor and/or virtual memory manager. In these examples, the multipathing driver 160 can be installed in kernel memory of the hypervisor, for supporting multipathing access to the storage array 130 by multiple operating system instances running on the host 110 or elsewhere. The multipathing driver can also be run within any of the virtual machines, either in place of or in addition to the multipathing driver installed on the hypervisor.

In addition, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 540 of FIG. 5 and the medium 640 of FIG. 6). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method operable on a computing device for obtaining performance information relating to data storage, comprising:
   providing, in a software driver running within a kernel of the computing device, multiple data buckets for storing information pertaining to a metric relating to data storage, each data bucket covering a different range of values of the metric;
   monitoring I/O operations attempted between the computing device and at least one logical storage unit (LUN) to produce multiple values of the metric;
   assigning each value of the metric to one of the data buckets for the metric;
   counting the number of values of the metric assigned to each data bucket to produce multiple data bucket totals; and
   discarding the counted values of the metric,
   wherein each value of the metric is related to a respective I/O request, and
   wherein monitoring I/O operations attempted between the computing device and at least one logical storage unit to produce multiple values of the metric includes, for at least one of the multiple values:
   detecting an arrival to the software driver of an I/O request and associating a first timestamp therewith;
   detecting a passage of the I/O request from the software driver and recording a second timestamp associated therewith;
   detecting a return to the software driver of a returning I/O response and associating a third timestamp therewith; and
   computing a latency value based on any two of the first through third timestamps.

2. The method as in claim 1, wherein assigning each value of the metric to one of the data buckets includes (i) comparing the value of the metric with a series of increasing limit values, wherein each contiguous pair of limit values in the series defines a bucket having an upper bound and a lower bound and (ii) identifying the bucket to which the value is to be assigned as the bucket for which the value falls between the lower bound and the upper bound.

3. The method as in claim 1, further comprising:
   for each I/O request, monitoring I/O operations between the computing device and the at least one LUN to produce a value of I/O latency; and
   for each data bucket, summing all values of I/O latency associated I/O requests whose I/O size is counted in the respective data bucket.

4. The method as in claim 1, wherein computing a latency value based on any two of the first through third timestamps includes
   calculating a value of I/O request latency reflecting a delay through the software driver by subtracting the first timestamp from the second timestamp.

5. The method as in claim 1, wherein computing a latency value based on any two of the first through third timestamps includes calculating a round-trip latency from the software driver to the LUN and back by subtracting the second timestamp from the third timestamp.

6. The method as in claim 5, further comprising, for each latency data bucket:
summing metric values for I/O latency for I/O requests counted in the respective latency data bucket to produce a first sum;
summing metric values for I/O size for I/O requests counted in the respective latency data bucket to produce a second sum;
storing the first sum and the second sum in kernel memory in connection with the respective latency data bucket.

7. The method as in claim 1, wherein the software driver directs I/O to be transmitted between the computing device and each at least one LUN through multiple paths, and wherein the method further comprises storing the data bucket totals in a data structure of the software driver organized by LUN, path to the LUN, and metric.

8. The method as in claim 1, wherein the software driver directs I/O to be transmitted between the computing device and each at least one LUN through multiple paths, and the method further comprises;
applying the data bucket totals to identify paths between the computing device and the at least one LUN that have higher performance relative to other paths; and
preferentially selecting the paths having higher performance for servicing I/O requests with the at least one LUN.

9. The method as in claim 1, further comprising:
providing an administrative interface to the software driver;
receiving instructions from a user of the administrative interface; and
executing the received instructions to control operations of the software driver,
wherein the operations include enabling and disabling monitoring of I/O operations.

10. The method as in claim 1, wherein the data buckets cover contiguous ranges having exponentially increasing sizes.

11. The method as in claim 1, further comprising, for each data bucket:
summing metric values for I/O size for I/O requests counted in the respective data bucket to produce a first sum;
summing metric values for round trip I/O latency for I/O requests counted in the respective data bucket to produce a second sum;
storing the first sum and the second sum in kernel memory in connection with the respective data bucket.

12. The method of claim 1, wherein monitoring I/O operations attempted between the computing device and at least one logical storage unit further includes detecting a passage of the returning I/O response from the software driver and associating a fourth timestamp therewith, and wherein the method further comprises:
computing a forward driver latency value based on a difference between the first and second timestamps;
computing a reverse driver latency value based on a difference between the third and fourth timestamps; and
computing a round trip latency value based on the difference between the first and fourth timestamps.

13. A computing device, comprising:
a processor; and
memory, coupled to the processor, the memory constructed and arranged to store instructions executable by the processor,
wherein the processor executing instructions from the memory forms a specialized circuit constructed and arranged to:
run a software driver within a kernel of the computing device;
provide, in the software driver, multiple data buckets for storing information pertaining to a data storage metric, each data bucket covering a different range of values of the metric;
monitor I/O operations attempted between the computing device and at least one logical storage unit (LUN) to produce multiple values of the metric;
assign each value of the metric to one of the data buckets for the metric;
count the number of values of the metric assigned to each data bucket to produce multiple data bucket totals; and
discard the counted values of the metric
wherein each value of the metric is related to a respective I/O request, and
wherein the specialized circuit is further constructed and arranged to:
detect an arrival to the software driver of an I/O request and associating a first timestamp therewith;
detect a passage of the I/O request from the software driver and recording a second timestamp associated therewith;
detect a return to the software driver of a returning I/O response and associating a third timestamp therewith; and
computing a latency value based on any two of the first through third timestamps.

14. The computing device as in claim 13, wherein the specialized circuit is further constructed and arranged to
apply the data bucket totals to identify paths between the computing device and the at least one LUN that have higher performance relative to other paths, and
preferentially select the paths having higher performance for servicing I/O requests with the at least one LUN.

15. The computing device as in claim 13, wherein the specialized circuit is further constructed and arranged to assign each value of the metric to one of the data buckets by (i) comparing the value of the metric with a series of increasing limit values wherein each contiguous pair of limit values in the series defines a bucket having an upper bound and a lower bound and (ii) identifying the bucket to which the value is to be assigned as the bucket for which the value falls between the lower bound and the upper bound.

16. The computing device of claim 13, wherein the specialized circuit is further constructed and arranged to
calculate a value of I/O request latency by subtracting the first timestamp from the second timestamp.

17. The computing device of claim 13, wherein the specialized circuit is further constructed and arranged to
calculate a round-trip latency from the software driver to the LUN and back by subtracting the second timestamp from the third timestamp.

18. A non-transitory computer readable medium including instructions which, when executed by a processor of a computing device, cause the processor to perform a method for obtaining performance information relating to data storage, the method comprising:
providing, in a software driver within a kernel of the computing device, multiple data buckets for storing information pertaining to a data storage metric, each data bucket covering a different range of values of the metric;

monitoring I/O operations attempted between the computing device and at least one logical storage unit (LUN) to produce multiple values of the metric;

assigning each value of the metric to one of the data buckets for the metric;

counting the number of values of the metric assigned to each data bucket to produce multiple data bucket totals; and discarding the counted values of the metric, wherein each value of the metric is related to a respective I/O request and wherein monitoring I/O operations attempted between the computing device and at least one logical storage unit to produce multiple values of the metric includes, for at least one of the multiple values:

detecting an arrival to the software driver of an I/O request and associating a first timestamp therewith;

detecting a passage of the I/O request from the software driver and recording a second timestamp associated therewith;

detecting a return to the software driver of a returning I/O response and associating a third timestamp therewith; and computing a latency value based on any two of the first through third timestamps.

19. The non-transitory computer readable medium as in claim 18, wherein the method further comprises:

applying the data bucket totals to identify paths between the computing device and the at least one LUN that have higher performance relative to other paths; and preferentially selecting the paths having higher performance for servicing I/O requests with the at least one LUN.

20. A method operable on a computing device for obtaining performance information relating to data storage, comprising:

providing, in a software driver running within a kernel of the computing device, multiple data buckets for storing information pertaining to a metric relating to data storage, each data bucket covering a different range of values of the metric;

monitoring I/O operations attempted between the computing device and at least one logical storage unit (LUN) to produce multiple values of the metric;

assigning each value of the metric to one of the data buckets for the metric;

summing the values of the metric assigned to each data bucket to produce multiple data bucket sums; and discarding the values of the metric, wherein monitoring I/O operations includes, for at least one of the multiple values:

detecting an arrival to the software driver of an I/O request and associating a first timestamp therewith;

detecting a passage of the I/O request from the software driver and recording a second timestamp associated therewith;

detecting a return to the software driver of a returning I/O response and associating a third timestamp therewith; and computing a latency value based on any two of the first through third timestamps.

\* \* \* \* \*